US012487900B2

United States Patent
Gokhale et al.

(10) Patent No.: US 12,487,900 B2
(45) Date of Patent: Dec. 2, 2025

(54) MEMORY FAULT MANAGEMENT FOR SOFTWARE

(71) Applicant: Hitachi Astemo, Ltd., Ibaraki (JP)

(72) Inventors: Akshay Vijay Gokhale, Northville Township, MI (US); Hiroaki Itsuji, Novi, MI (US)

(73) Assignee: HITACHI ASTEMO, LTD., Ibaraki (JP)

( * ) Notice: Subject to any disclaimer, the term of this patent is extended or adjusted under 35 U.S.C. 154(b) by 66 days.

(21) Appl. No.: 18/393,842

(22) Filed: Dec. 22, 2023

(65) Prior Publication Data

US 2025/0208965 A1    Jun. 26, 2025

(51) Int. Cl.
| G06F 11/00 | (2006.01) |
| G06F 11/08 | (2006.01) |
| G06F 11/263 | (2006.01) |
| G06F 11/27 | (2006.01) |
| G06N 20/00 | (2019.01) |

(52) U.S. Cl.
CPC ............ G06F 11/263 (2013.01); G06F 11/08 (2013.01); G06F 11/27 (2013.01); G06N 20/00 (2019.01)

(58) Field of Classification Search
CPC ................................. G06F 11/07; G06F 11/08
See application file for complete search history.

(56) References Cited

U.S. PATENT DOCUMENTS

| 6,173,243 B1 * | 1/2001 | Lowe ....................... G06F 30/33 716/136 |
| 2005/0114112 A1 | 5/2005 | Rivoir et al. |
| 2010/0005366 A1 * | 1/2010 | Dell ........................ G11C 29/70 714/764 |
| 2011/0191526 A1 * | 8/2011 | Haukness .............. G11C 16/32 711/E12.008 |
| 2013/0325820 A1 * | 12/2013 | Grube ................. G06F 11/0727 707/691 |
| 2016/0179382 A1 * | 6/2016 | Blagodurov ............ G06F 3/061 711/154 |

(Continued)

OTHER PUBLICATIONS

B. Motruk, J. Diemer, P. Axer, R. Buchty and M. Berekovic, "Safe Virtual Interrupts Leveraging Distributed Shared Resources and Core-to-Core Communication on Many-Core Platforms," 2013 IEEE 19th Pacific Rim International Symposium on Dependable Computing, Vancouver, BC, Canada, 2013 (Year: 2013).*

(Continued)

Primary Examiner — Bryce P Bonzo
Assistant Examiner — Gabriella Kanani Shelton
(74) Attorney, Agent, or Firm — MATTINGLY & MALUR, PC

(57) ABSTRACT

In some examples, a system monitors for a memory fault associated with execution of software. Based at least on receiving an indication of a possible memory fault, the system scans a first area of the memory based on a data structure that indicates that the first area of the memory stores a portion of parameters of the software that affect an accuracy of the software if there is a memory fault in the first area of the memory. Based at least on the scanning indicating that there is a memory fault in the first area of the memory, the system remaps the portion of parameters of the software from the first area to a second area of the memory that is determined to be free.

17 Claims, 6 Drawing Sheets

(56) References Cited

U.S. PATENT DOCUMENTS

| | | |
|---|---|---|
| 2017/0315891 A1 | 11/2017 | Park et al. |
| 2022/0138353 A1 | 5/2022 | Inoue |
| 2022/0350518 A1* | 11/2022 | Koutsovasilis ......... G06F 12/08 |
| 2023/0395177 A1* | 12/2023 | Schaefer ................ G11C 29/44 |
| 2024/0069764 A1* | 2/2024 | Schaefer ............... G06F 3/0616 |

OTHER PUBLICATIONS

D. Baranwal, D. Singh, K. Soyeb, S. S. Rout and S. Deb, "Reliability Enhancement of SoCs Based on Dynamic Memory Access Profiling in Conjunction with PVT Monitoring," 2015 28th International Conference on VLSI Design, Bangalore, India, 2015, pp. 541-546 (Year: 2015).*

* cited by examiner

MEMORY FAULT MANAGEMENT FOR SOFTWARE

BACKGROUND

Advanced driver assistance systems (ADAS), semi-autonomous vehicle systems, self-driving systems, and otherwise autonomous driving (AD) systems are systems that automate or otherwise enhance vehicle control for improved safety, automated navigation, and the like. AD/ADAS systems typically utilize data from onboard sensors such as cameras, Lidars, Radars, and so forth, for detecting information related to the environment surrounding the vehicle and for making predictions that are then used to determine vehicle control functions.

With recent advancements in artificial intelligence (AI) technologies, such as deep neural networks (DNN) and other types of machine learning, AI functions are rapidly being adopted in AD/ADAS systems. Moreover, these functions are being implemented in vehicle computing devices, including in embedded systems such as electronic control units (ECU). The AI functions may use millions of learned parameters to make accurate classifications or predictions. Input data, model parameters, and instruction sets to process the input data are typically stored in a memory associated with the embedded systems. However, the operation of these AI algorithms can be affected by hardware faults, such as transient, intermittent, or permanent faults in memory, which may cause prediction or classification errors. Permanent faults in memory may occur for several reasons, such as electrostatic discharge, cosmic radiation, fabrication flaws, or persistent intermittent faults occurring in the system. When a fault in memory causes an AI error, the results may prove to be hazardous, particularly if the fault affects a safety-critical system.

SUMMARY

In some implementations, a system monitors for a memory fault associated with execution of software. Based at least on receiving an indication of a possible memory fault, the system scans a first area of the memory based on a data structure that indicates that the first area of the memory stores a portion of parameters of the software that affect an accuracy of the software if there is a memory fault in the first area of the memory. Based at least on the scanning indicating that there is a memory fault in the first area of the memory, the system remaps the portion of parameters of the software from the first area to a second area of the memory that is determined to be free.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION

Figure 1:
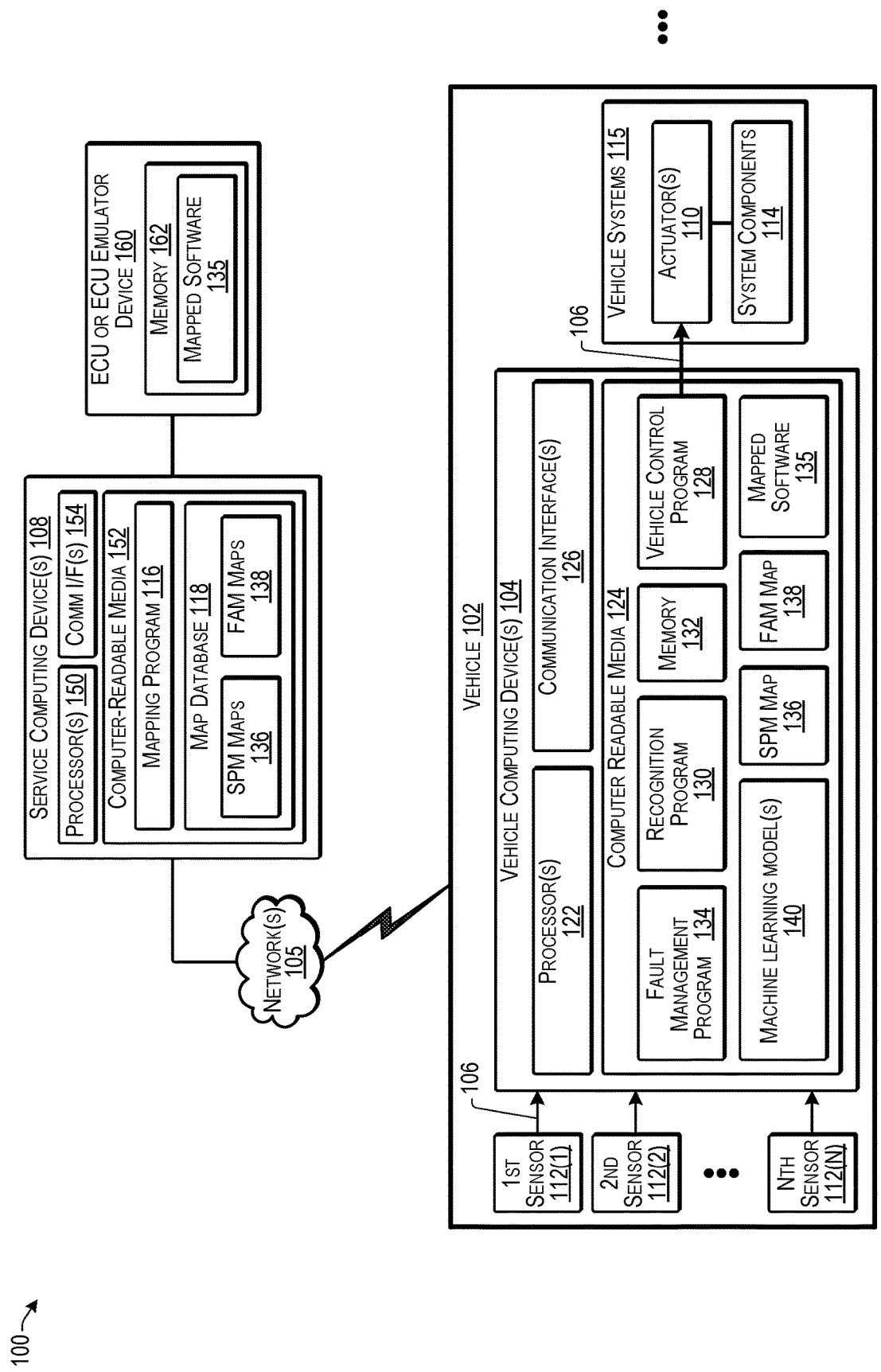
FIG. 1 illustrates an example physical and logical architecture of a system able to manage faults that may occur in a memory associated with executable software according to some implementations.

Some implementations herein are directed to techniques and arrangements that include a capability for performing dynamic memory remapping to ensure the reliability and safety of vehicular operations. For instance, the implementations herein may be applied to improve the performance of safety-critical applications, as well as other applications, computer programs, or the like, executable on board vehicles or other computing devices. Some examples herein include identification of sensitive parameters for a selected algorithm, application, executable code, computer program, or other software that is intended for deployment and execution on a plurality of computing devices, such as computing devices on board a plurality of vehicles. The sensitive parameters of the software may be those parameters of the software that, if affected by a memory fault, cause a change in the output of the software, or otherwise cause a change in performance of the software so that the software does not perform as intended. To determine the sensitive parameters, a sensitivity analysis may be performed on each piece of software before the software is deployed on the plurality of vehicles. For instance, sensitive parameters of the software may be identified and a map of memory locations of those sensitive parameters may be generated.

When a possible memory fault is detected in the device memory region, only the portion of the memory corresponding to the SPM map is scanned to avoid scanning the entire memory of the computing device. If the scan indicates that there is a fault in the memory corresponding to the parameter memory location, then the memory region of sensitive parameters are remapped from that memory to a fault-free memory region determined from the free area memory (FAM) map while ensuring the real-time execution latency for the algorithm, i.e., ensuring that the mapped software is still able to execute within a specified time threshold.

The implementations herein are able to manage hardware errors in memory or processors, such as permanent faults in chips, which can cause abnormalities in predictions made by algorithms, and which, in the case of safety-critical applications, or other safety-critical mapped software, can cause a significant likelihood of crash, injury, damage, or the like. As one example, a permanent fault may cause memory to be stuck at one or more locations. Typically, these faults may require chip replacement as the only practical remedy, which is costly. However, implementations herein are able to determine where the portions of the mapped software that are sensitive to memory faults utilize the memory, and, if a fault in that portion of the memory should occur, remap the memory used by the sensitive portions away from the memory area with the detected fault.

Additionally, the techniques herein may be employed with various different ECU architectures and other computing device configurations, such as to help maintain the expected performance of respective different safety-critical software that may be executing on respective different ECUs or other computing devices. For example, the techniques herein are scalable to conventional, domain, and zone or integrated ECUs that run safety-critical applications or any of various other types of software that might be mapped using the techniques herein. For example, edge devices that run AI prediction models or other real-time applications may also use the techniques herein to reduce the cost of chip replacement when a memory fault is detected.

For discussion purposes, some example implementations are described in the environment of detecting faults in memory associated with a vehicle computing device, such as an ECU. However, implementations herein are not limited to the particular examples provided, and may be extended to other types of computing devices, other types of system configurations, other types of vehicles, other types of machine learning and AI models, non-vehicle computing devices, and so forth, as will be apparent to those of skill in the art in light of the disclosure herein.

FIG. 1 illustrates an example physical and logical architecture of a system able to manage faults that may occur in a memory associated with executable software according to some implementations. In this example, a vehicle 102 includes one or more vehicle computing devices 104 able to communicate over one or more networks 105 with one or more service computing devices 108. In addition, the one or more vehicle computing devices 104 are able to communicate over one or more communication links 106 with one or more actuators 110 and one or more onboard sensors 112, such as sensors 112(1), 112(2), . . . , 112(N). For example, the onboard sensors 112 may provide sensor data regarding the environment surrounding the vehicle 102. Further, the actuators 110 may receive one or more control signals from the one or more vehicle computing devices 104 based on results of sensor data processing performed by the one or more vehicle computing devices 104. For instance, the vehicle computing device(s) 104 may be included in a vehicle 102 that has actuators 110 that can control one or more vehicle system components 114 of one or more vehicle systems 115, such as for controlling some or all aspects of vehicle operation, such as steering, brakes, acceleration, signaling, lighting, or any of various other vehicle systems 115.

Examples of sensors 112 may typically include one or more of cameras (mono and/or stereo, visible light and/or near infrared), lidar sensors, radar sensors, ultrasonic sensors, thermal imaging sensors, a Global Navigation Satellite System (GNSS) sensor or other position sensor, a steering wheel position sensor (or a front wheel position sensor in the case that there is no steering wheel in the vehicle), a vehicle speed sensor; and various other vehicle condition sensors, as is known in the art. Furthermore, in some examples, some sensors 112 may provide sensor data directly to the one or more vehicle computing devices 104. Numerous variations will be apparent to those of skill in the art having the benefit of the disclosure herein.

The vehicle computing devices 104 may typically communicate with each other, the sensors 112, and the actuators 110 over the communication link 106, such as via a wired connection, e.g., a vehicle bus according to a vehicle bus protocol, Ethernet connections, or any other suitable protocol. As an example, the communication link 106 may include a Controller Area Network bus (CAN bus) that enables communication according to the CAN bus protocol. The CAN bus protocol is a vehicle bus protocol that allows ECUs and other vehicle devices and systems to communicate with each other without a host computer. Furthermore, the communication links 106 are not limited to a CAN bus protocol, and may include other types of wired and wireless networking technologies, such as Ethernet, fiber optics, Wi-Fi or other short range wireless technology, and so forth. Consequently, implementations herein are not limited to any particular networking technology or protocol.

In addition, at least the one or more vehicle computing devices 104 may communicate over the one or more networks 105 with the one or more service computing devices 108, which are remote from the vehicle 102, i.e., not located on board the vehicle 102. As an example, the one or more service computing devices 108 may include cloud servers, edge servers, combinations thereof, or other suitable computing devices, such as desktops, laptops, workstations, mobile devices, or the like. The service computing device(s) 108 may maintain, or may access, a mapping program 116, and in some examples, a map database 118, each of which is discussed additionally below.

The one or more networks 105, or portions thereof, may include any appropriate network, including a wireless network, such as a cellular network; other radio networks, such as vehicle to vehicle (V2V), a wide area network, such as the Internet; a local area network, such as an intranet; a local wireless network, such as Wi-Fi; close-range wireless communications, such as BLUETOOTH®; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail.

As defined by the Society of Automotive Engineers (SAE), the concept of autonomous driving mainly starts from "Level 3" (conditional driving automation), in which the vehicle itself may monitor the surroundings and may exert some control over the vehicle (e.g., automatic emergency braking). At "Level 4" (high driving automation) a vehicle may be able to drive independently most of the time but will not operate unless all conditions are met, and an operator is still required to be able to take over. At "Level 5" (full driving automation) the vehicle is able to drive anywhere in all conditions without an operator. Some examples herein may be useful for level 3-5 driving automation systems and autonomous driving vehicles.

As one example, an autonomous driving system for the vehicle 102 may include three major functions, namely, perception, cognition, and control. The perception function may include receiving on-board vehicle sensor data such as from cameras, lidar, radar, and/or other sensors. The sensor data is then processed using conventional and/or machine learning algorithms to identify obstacles, pedestrians, road signs, road features, traffic lights, and so forth. Based on recognition information, the cognition function can make driving plans and generate safe drivable trajectories for the vehicle 102. The trajectories may then be used to generate the control signals such as acceleration instructions, braking instruction, steering instructions, and the like, for following a determined trajectory. The control signals are sent to various vehicle systems for execution. However, as one example, should there be a memory fault that causes a faulty recognition result or that significantly delays the recognition result, the safe operation of the vehicle may be jeopardized.

The solution herein enables the vehicle computing devices to detect a memory fault and take corrective action for dynamically remapping memory locations to avoid a reoccurrence of the fault, thereby improving the safety of the vehicle operation. Furthermore, while the above example refers to the recognition process, the techniques herein may be applied to any algorithm whose proper execution is significant for the safe or effective operation of the vehicle 102.

In this example, the one or more vehicle computing devices 104 include one or more processors 122, one or more computer readable media 124, and one or more communication interfaces 126. In some examples, the one or more vehicle computing devices 104 may include one or more ECUs (electronic control units) or any of various other types of computing devices. For instance, the computing device(s) 104 may include one or more ADAS/AD ECUs for controlling at least some actuators 110 of the vehicle systems 115, such as to perform ADAS and/or AD tasks, such as navigation, braking, steering, acceleration, deceleration, and so forth. The computing device(s) 104 may also include one or more other ECUs, such as for controlling the actuators 110 of other systems of the vehicle systems 115, the sensors 112, and so forth.

"ECU" is a generic term for any embedded processing system that controls one or more of the systems 115, subsystems, or components 114 in a vehicle. Software, such as a vehicle control program 128 and a recognition program 130 may be executed by one or more ECUs and may be stored in a portion of the computer readable media 128 (e.g., program ROM, solid state storage, etc., as discussed below) associated with the respective ECU to enable the ECU to operate as an embedded system. ECUs on a vehicle may typically communicate with each other over a vehicle bus, such as the CAN bus mentioned above, according to a vehicle bus protocol.

Each ECU or other vehicle computing device 104 may include one or more processors 122, which may include a single processing unit or a number of processing units, and may include single or multiple computing units or multiple processing cores. For example, the one or more processors 122 may include one or more of central processing units (CPUs), system-on-chip (SOC) processors, graphics processing units (GPUs), microprocessors, microcomputers, microcontrollers, digital signal processors, state machines, logic circuits, and/or other devices that manipulate signals based on operational instructions. As one example, the processor(s) 122 may include one or more hardware processors and/or logic circuits of any suitable type specifically programmed or configured to execute the algorithms and other processes described herein. The processor(s) 122 may be configured to fetch and execute computer readable instructions stored in the computer readable media 124, which may program the processor(s) 122 to perform the functions described herein.

The computer readable media 124 may include volatile and nonvolatile memory 132 as well as storage devices, and/or removable and non-removable media implemented in any type of technology for storage of information, such as computer readable instructions, data structures, programs, program modules, and other code or data. For example, the computer readable media 124, including the memory 132, may include, but is not limited to, RAM, ROM, EEPROM, flash memory or other memory technology, as well as optical storage, solid state storage, magnetic disk, cloud storage, or any other medium that can be used to store the desired information and that can be accessed by a computing device.

Depending on the configuration of the one or more vehicle computing devices 104, the computer readable media 124 may be a tangible non-transitory medium to the extent that, when mentioned, non-transitory computer readable media exclude media such as energy, carrier signals, electromagnetic waves, and/or signals per sec. In some cases, the computer readable media 124 may be at the same location as the one or more vehicle computing devices 104, while in other examples, the computer readable media 124 may be partially remote from the one or more vehicle computing devices 104, such as accessible over a wireless network or the like, such as the one or more networks 105.

The computer readable media 124 may be used to store any number of functional components that are executable by the processor(s) 122. In many implementations, these functional components comprise instructions, programs, algorithms, or other software that are executable by the processor(s) 122 and that, when executed, specifically program the processor(s) 122 to perform the actions attributed herein to the one or more vehicle computing devices 104. Functional components stored in the computer readable media 124 may include a fault management program 134 that may be executed for managing remapping of memory when a memory fault is detected in memory used for execution of mapped software 135, as discussed according to the implementations herein.

In addition, the functional components may include the mapped software 135 that is executable on the processor(s) 122 and which, in some examples, may be a safety critical piece of software, such as an algorithm, executable code, application, or other computer program. As one example, the mapped software 135 may determine real-time predictions for controlling at least a portion of at least one vehicle system 115 based at least on sensor information received from the plurality of vehicle sensors 112. Further, in some examples, the mapped software is not safety critical, but may be any software that is executable on a computing device, and for which a sensitive parameters memory (SPM) map 136 and a free area memory (FAM) map 138 have been determined for a designated ECU and memory configuration. Furthermore, in some examples, the mapped software 135 may include numerous different computer programs, different pieces of executable code, different pieces of software, different algorithms, and so forth, each of which may have its own SPM map 136 and FAM map 138.

Additional functional components that may be stored in the computer readable media 124 in some examples may include the recognition program 130 and the vehicle control program 128, each of which may include one or more computer programs, applications, executable code, or portions thereof. Furthermore, in some examples, the recognition program 130 and/or the vehicle control program 128 may be, or may include, mapped software 135. Additionally, while the programs 134, 130 and 128 are illustrated as separate programs in this example, some or all of these programs may be combined into one or more programs, or divided into a larger number of programs, or the like.

In addition, the computer readable media 124 may store data, data structures, and other information used for performing the functions and services described herein. For example, the computer readable media 124 may store the SPM map 136 and the FAM map 138 for the mapped software 135, and which may be used for remapping sensitive parameters of an algorithm to different portions of the memory 132 when a fault is detected in the memory 132, as discussed additionally below with respect to FIGS. 2-5.

Additionally, the computer readable media 124 may store one or more machine learning models 140, such as one or more predictive models that may be used by the recognition program 130 or by the vehicle control program 128. Examples of machine learning models 140 that may be used in some examples herein may include artificial neural networks, such as deep learning neural networks, self-organizing neural networks, recurrent neural networks, convolutional neural networks, modular neural networks, or the like, as well as other types of predictive models, decision trees, classifiers, regression models, such as linear regression models, support vector machines, stochastic models, such as Markov models and hidden Markov models, and so forth.

The one or more vehicle computing devices 104 may also include or maintain other functional components and data, which may include other programs, drivers, etc., and the data used or generated by the functional components. Further, the one or more vehicle computing devices 104 may include many other logical, programmatic, and physical components, of which those described above are merely examples that are related to the discussion herein.

The one or more communication interfaces 126 may include one or more software and hardware components for enabling communication with various other devices, such as over the communication links 106 and/or over a cellular network or other wireless communication network for communicating with the service computing device(s) 108, other vehicles, and the like. For example, the communication interface(s) 126 may enable communication through one or more of a LAN, the Internet, cable networks, cellular networks, other radio networks, other wireless networks (e.g., Wi-Fi) and wired networks (e.g., CAN, fiber optic, Ethernet), direct connections, as well as close-range communications such as BLUETOOTH®, and the like.

The service computing device(s) 108 may include one or more servers or other types of computing devices that may be embodied in any number of ways. For instance, in the case of a server, the programs, other functional components, and data may be implemented on a single server, a cluster of servers, a server farm or data center, a cloud-hosted computing service, an edge server, and so forth, although other computer architectures may additionally or alternatively be used.

Further, while the figures illustrate the functional components and data of the service computing device(s) 108 as being present in a single location, these components and data may alternatively be distributed across different computing devices and different locations in any manner. Consequently, the functions may be implemented by one or more service computing devices 108, with the various functionality described herein distributed in various ways across the different service computing devices 108. Multiple service computing devices 108 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 108 may include one or more processors 150, one or more computer readable media 152, and one or more communication interfaces (I/Fs) 154. Each processor 150 may be a single processing unit or a number of processing units, and may include single or multiple computing units or multiple processing cores. The processor(s) 150 can be implemented as one or more microprocessors, microcomputers, microcontrollers, digital signal processors, central processing units, graphics processing units, system-on-chip processing units, state machines, logic circuitries, and/or any devices that manipulate signals based on operational instructions. For instance, the processor(s) 150 may be one or more hardware processors and/or logic circuits of any suitable type specifically programmed or configured to execute the algorithms and processes described herein. The processor(s) 150 can be configured to fetch and execute computer readable instructions stored in the computer readable media 152, which can program the processor(s) 150 to perform the functions described herein.

The computer readable media 152 may include volatile and nonvolatile memory and/or removable and non-removable storage media implemented in any type of technology for storage of information, such as computer readable instructions, data structures, program modules, or other data. Such computer readable media 152 may include, but is not limited to, RAM, ROM, EEPROM, flash memory or other memory technology, optical storage, solid state storage, magnetic tape storage, magnetic disk storage, storage arrays, network attached storage, storage area networks, cloud storage, or any other medium that can be used to store the desired information and that can be accessed by a computing device. Depending on the configuration of the service computing device(s) 108, the computer readable media 152 may be a type of computer readable storage media and/or may be a tangible non-transitory media to the extent that when mentioned herein, non-transitory computer readable media exclude media such as energy, carrier signals, electromagnetic waves, and signals per se.

The computer readable media 152 may be used to store any number of functional components that are executable by the processors 150. In many implementations, these functional components comprise instructions or programs that are executable by the processors 150 and that, when executed, specifically configure the one or more processors 150 to perform the actions attributed above to the service computing device(s) 108. Functional components stored in the computer readable media 152 may include the mapping program 116. For example, the mapping program 116 may perform testing of the mapped software 135 to generate the SPM map 136 and the FAM map 138 using techniques as discussed additionally below, and may provide these maps to the vehicles 102 such as through the networks 105, or, alternatively, through provision of the maps 136, 138 to the vehicle manufacturer, other OEM provider, or through any of various other methods.

In addition, the computer readable media 152 may store data used for performing the operations described herein. Thus, in some examples, the computer readable media 152 may include the map database 118, which may include one or more SPM maps 136 and FAM maps 138 that have been generated by execution of the mapping program 116 for various different vehicles. For instance, in some examples, the service computing devices may generate SPM maps 136 and FAM maps 138 for numerous different vehicle models and brands as part of the manufacturing process for these vehicles.

Figure 2:
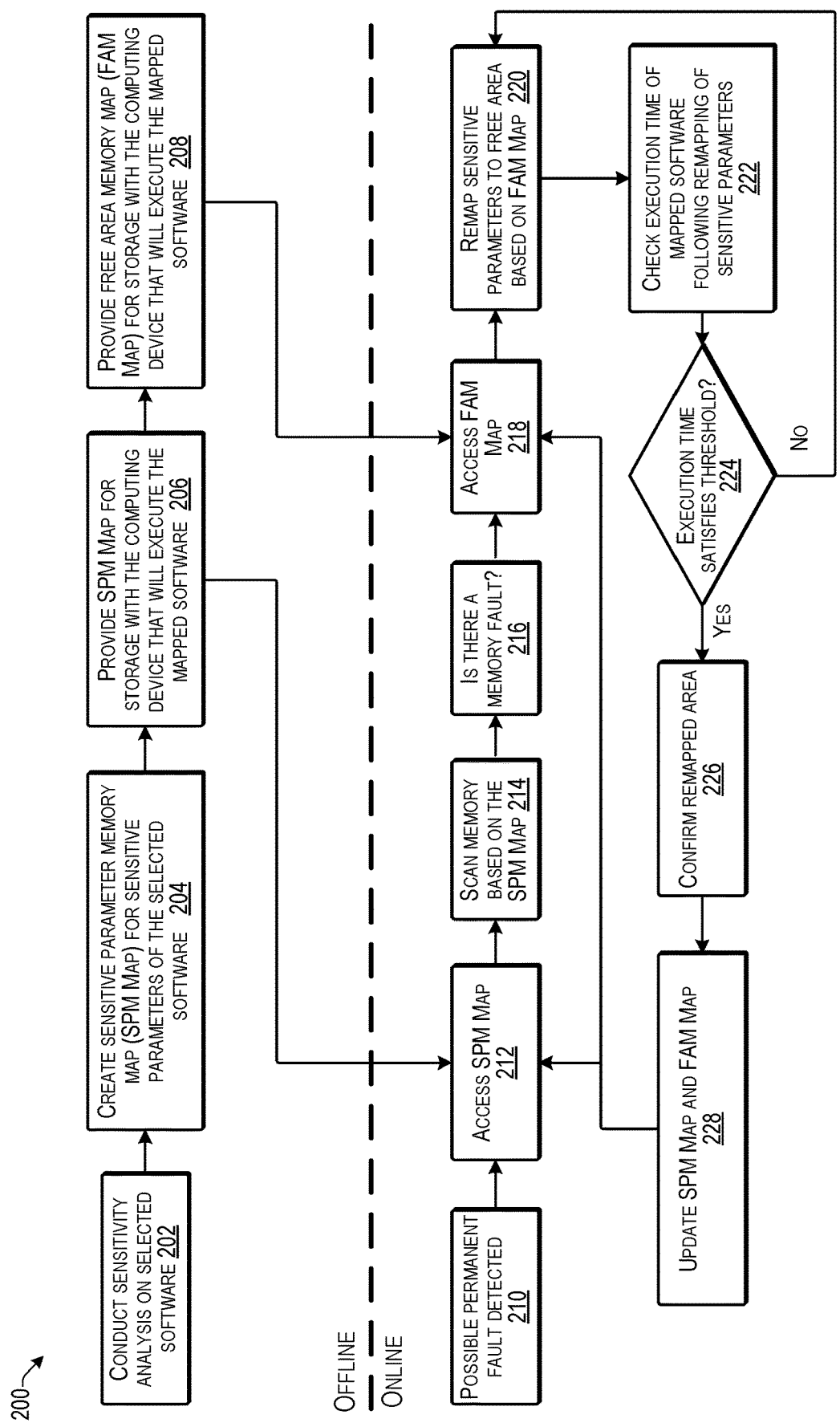
FIG. 2 is a flow diagram illustrating an example process for managing memory faults according to some implementations.

Further, the service computing device 108 may also include or maintain other functional components and data not specifically shown in FIG. 2, which may include programs, drivers, etc., and the data used or generated by the functional components. Additionally, the service computing device(s) 108 may include many other logical, programmatic, and physical components, of which those described above are merely examples that are related to the discussion herein.

The communication interface(s) 154 may include one or more interfaces and hardware components for enabling communication with various other devices, such as over the network(s) 105. For example, communication interface(s) 154 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

As an example, such as during a vehicle design or development stage, the SPM map 136 and the FAM map 138 may be determined for a particular piece of software (the mapped software 135) that will be executed on a selected ECU, such as may be installed on a particular vehicle brand, model, model year, trim level, and so forth. For instance, the selected ECU may be manufactured or installed with a known memory configuration for executing a selected computer program as the mapped software 135. In examples herein, the mapping stage may be referred to as an "offline" mode since the mapping is performed during testing of the mapped software 135 on a test ECU or, alternatively, an ECU emulator (aka a "virtual ECU"). For example, the test ECU may be an example of the selected ECU that is intended to be installed in the vehicle 102 during production of the vehicle 102.

For generating the SPM map 136 and the FAM map 138, the service computing device 108 may be in communication with an ECU or ECU emulator device 160. For example, the ECU or ECU emulator device 160 may be an example of the ECU that has been selected to be installed in the vehicle 102 during production of the vehicle 102 as one of the vehicle computing devices 104. Further, the ECU or ECU emulator device 160 may include a memory 162 that maintains at least a portion of the mapped software 135 during testing execution of the mapped software, and that maps to the memory 132 that will be installed and used by the vehicle computing device(s) 104 that will execute the mapped software 135 during operation of the vehicle 102.

Additionally, in some examples, the mapped software 135 that is tested and for which the maps 136 and 138 are generated may be categorized as a safety-critical program, while in other examples, the mapped software 135 may be any other algorithm, executable code, application, or other computer program for which an SPM map 136 and FAM map 138 are determined, such as, for example, a computer program whose execution is categorized as significant to the safe and effective operation of the vehicle 102, e.g., a computer program that plays a role in enabling the vehicle 102 to navigate safely and/or efficiently from a start point to a destination point.

Alternatively, as another example, the ECU or ECU simulator device 160 may be a computing device that is configured by executable instructions to provide a virtual ECU and corresponding memory space that is able emulate the operations and performance of an actual ECU and memory 132 that will be installed in the vehicle 102 during production. In either event, the memory 162 may map to the memory 132 of the vehicle computing devices 104 that will be used during execution of the mapped software 135 when the mapped software 135 is installed on the vehicle computing device(s) 104.

In some examples, during the design and development phase for the vehicle 102, the applications, computer programs, and other software that will be implemented on the ECUs (vehicle computing devices 104) of the vehicle 102 are finalized, and memory areas may be allocated and fixed for each piece of software, such as based on task execution priority. For example, the memory 132 may contain various regions, such as dynamic buffers, which store continuously changing data, such as video frames captured by cameras or static regions allocated to base software. Machine learning models 140, such as deep learning neural networks and other AI algorithms, may typically use millions of learned parameters to make accurate classifications or predictions. These parameters may also be stored in certain buffers in the memory 132 for inference of such machine learning models 140. However, these types of machine learning models 140 are susceptible to hardware faults, such as transient, intermittent, or permanent faults, which tend to induce prediction or classification errors. Permanent hardware faults may have a lasting impact on the system and are typically removed by replacing faulty hardware components.

When a system is affected by permanent memory faults, the system may portray fixed and/or repetitive errors such as "stuck-at-faults" in which the algorithm repetitively stops executing or otherwise begins to malfunction at a certain point. Permanent faults typically imply irreversible chip damage, for which the most effective solution is usually to replace the faulty chip, which may be a costly solution. Accordingly, to address these issues, the examples herein determine the SPM map 136 and FAM map 138 to generate mapped software 135 for one or more selected machine learning models 140, or other computer programs, applications, etc.

During the offline map generation process, sensitive parameters for the mapped software 135 are identified using a sensitivity analysis that identifies those parameters of the mapped software that are affected by a memory fault. As one example, pointers to the memory area(s) where these sensitive parameters are stored in the embedded system memory 132 are selected. A memory map of the sensitive parameters based on their sensitivity is created as the SPM map 136 for the selected piece of software being tested (the mapped software 135). The SPM map 136 may subsequently be stored by the vehicle computing device(s) 104 (or other types of computing devices) with other software, including the mapped software 135 and the fault management program 134. Furthermore, during the offline stage, once all the software is installed and executable on the ECU or ECU emulator device, the mapping program may determine the free memory areas of the memory 162 that corresponds to the memory 132 that will be present for the vehicle computing device(s) 104. Pointers and number of bytes for each free memory area may be mapped and stored based on the ease of accessibility of the free area. As one example, the free memory area may be located in the same memory chip or in another memory chip associated with the ECU. The FAM map 138 is also subsequently stored with the vehicle computing device(s) 104 that will execute the mapped software 135. Furthermore, while the examples herein are described in the environment of execution on a vehicle computing device 104, such as an ECU, in other examples, the mapped software 135 may be executed on any other type of computing device.

Once the ECU is installed in the vehicle as one of the vehicle computing devices 104, and is online (i.e., working in real time) to execute the mapped software 135, the fault management program 134 may continuously monitor the execution of mapped software 135 for errors. If a possible permanent fault is detected by the fault management program 134, then initially, the SPM map 136 is accessed in the computer readable media 124. Based on the SPM map 136, the fault management program 134 scans the memory 132 associated with the vehicle computing device that is executing the mapped software 135. Advantageously, rather than scanning the entire memory 132, the fault management program 134 may scan only the portions of memory that have been mapped as maintaining the sensitive parameters that were determined during testing to be sensitive to memory faults. If memory corruption is found in one of these mapped sensitive parameter areas, a permanent fault may be confirmed, and the fault management program 134 may access the FAM map 138 from the computer readable media 124 and remap the sensitive parameters that were previously stored in the faulty portion of the memory 132 to a free area of memory determined from the FAM map 138. Following the remapping of the sensitive parameters to the new memory area, the execution time of the mapped software is evaluated, and if the execution time satisfies a threshold time, the remapped area is confirmed as the mapped location for the remapped sensitive parameters. The SPM map 136 is updated based on the current parameter mapping. On the other hand, if a fault is not found during the scan of the memory areas based on the SPM map 136, then the fault management program 134 sets itself to ignore the fault to ensure that the mapped software 135 continues to execute without any interruptions.

FIGS. 2-5 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

FIG. 2 is a flow diagram illustrating an example process 200 for managing memory faults according to some implementations. In this example, the process 200 may be executed by the system 100 discussed above or by other suitable computing devices. For example, a portion of the process 200 may be executed offline by the one or more service computing devices 108, such as by execution of the mapping program 116, and another portion of the process 200 may be executed online (e.g., during vehicle operation) by the one or more vehicle computing devices 104 or other types of computing devices, such as by execution of the fault management program 134. A horizontal dashed line separates the respective offline and online operations. Furthermore, while in this example, certain functions are illustrated as being performed by one of the service computing devices 108 or the vehicle computing devices 104, in other examples, at least some of the functions may be performed by the other one of the service computing devices 108 or the vehicle computing devices 104.

At 202, the service computing device may conduct sensitivity analysis on selected software. For example, as discussed above, the service computing device may be provided with a selected piece of software that is determined to be useful for operation of the vehicle to warrant generation of an SPM map 136 and an FAM map 138 for enabling the selected software to continue to operate despite the occurrence of a permanent memory fault in an area of memory used by the selected software.

At 204, the service computing device may create a sensitive parameter memory map (SPM map 136) for the sensitive parameters of the selected software. Details of the creation of the SPM map 136 are discussed additionally below, e.g., with respect to FIGS. 4 and 5.

At 206, the service computing device may provide the generated SPM map 136 for storage with the computing device that will execute the mapped software 135. For instance, the SPM map 136 may be provided with the mapped software 135 that is installed on the corresponding ECU when the vehicle 102 is undergoing production. In other examples, the service computing device may send the SPM map 136 to the vehicle 102 over the air after production is complete.

At 208, the service computing device may determine and provide a free area memory map (FAM map 138) for storage with the computing device that will execute the mapped software 135.

After the SPM map 136 and the FAM map 138 have been generated for the mapped software 135, the mapped software 135 may be executed during an online stage, such as by being executed by a vehicle computing device 104, as discussed above with respect to FIG. 1. Furthermore, the fault management program 134 may also be executed to monitor for possible memory faults such as by monitoring execution of the mapped software 135. The fault management program 134 may be executed by the same computing device as that executing the mapped software 135, or may be executed by a different computing device such as a different vehicle computing device 104.

At 210 the computing device executing the fault management program 134 may detect a possible permanent fault associated with memory used by the mapped software 135.

At 212, the computing device accesses the SPM map 136, such as by retrieving the SPM map from a local storage.

At 214, the computing device may scan the memory used by the mapped software based on the SPM map 136. For example, the SPM map 136 may indicate which portions of the memory are used for storing sensitive parameters of the mapped software 135 that are sensitive to memory faults.

At 216, the computing device determines whether memory fault has been detected in the scanned memory areas. If so, the process proceeds to 218. If not, the fault management program 134 may ignore the detected fault.

At 218, when a permanent memory fault is detected in an area memory used to store sensitive parameters of the mapped software 135, the computing device may access the FAM map 138 for determining one or more free areas of available memory.

At 220, the computing device may remap the sensitive parameters of the mapped software 135 currently mapped to the faulty memory area to a free area of memory based on the FAM map 138.

At 222, the computing device may check the execution time of the mapped software following the remapping of the sensitive parameters.

At 224, the computing device determines whether the execution time for the mapped software satisfies a predetermined threshold time. If so, the process goes to 226. If not, the process goes back to 220 to map the sensitive parameters to a different free memory area.

At 226, if the execution time threshold is satisfied, the re-mapped memory area for the sensitive parameters is confirmed.

At 228, the computing device updates the SPM map 136 and the FAM map 138 based on the remapping performed in response to the detected fault.

Figure 3:
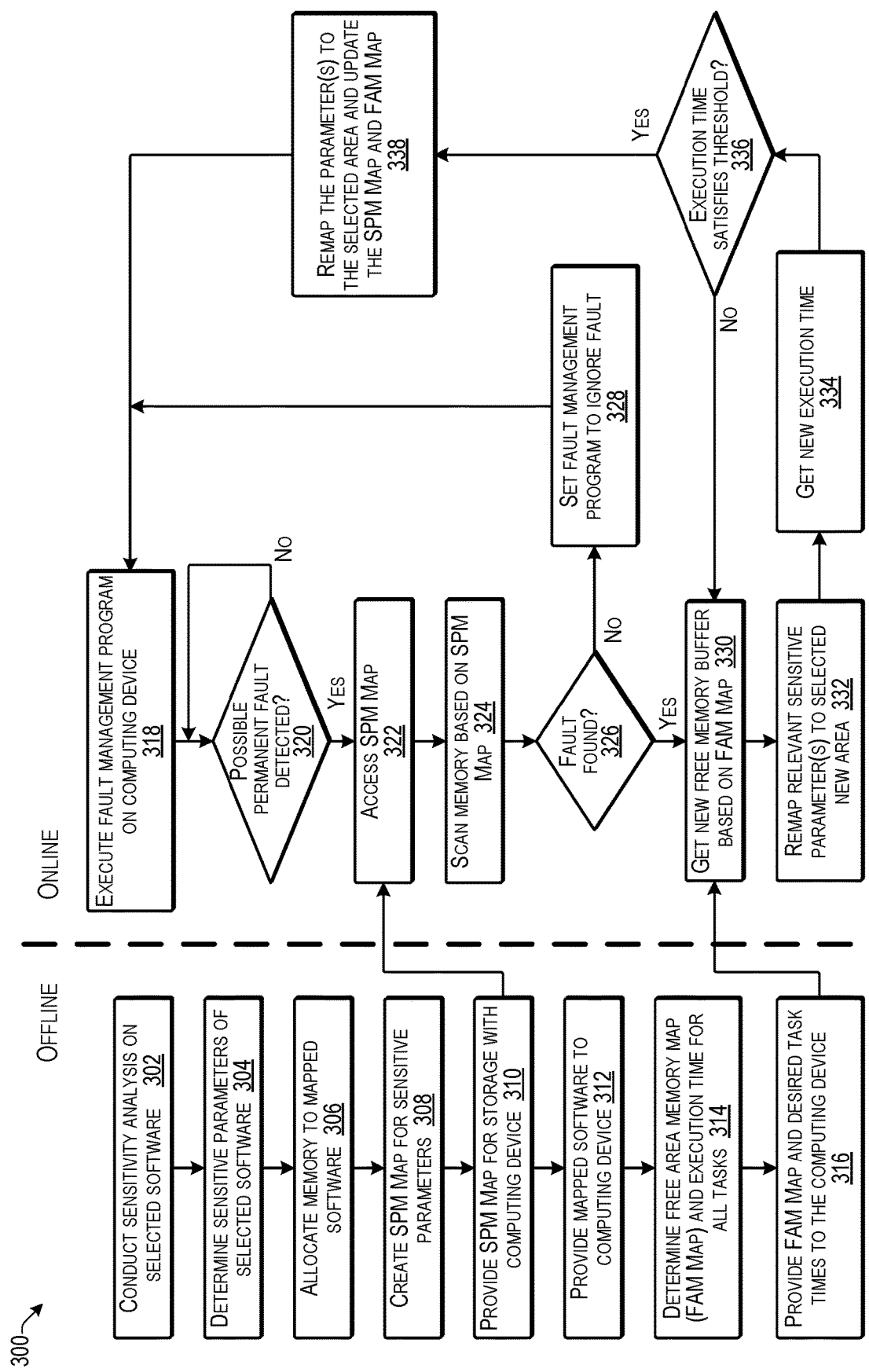
FIG. 3 is a flow diagram illustrating an example process for managing memory faults according to some implementations.

FIG. 3 is a flow diagram illustrating an example process 300 for managing memory faults according to some implementations. In some examples, the process 300 may be executed by the system 100 discussed above or by other suitable computing devices. For example, a portion of the process 300 may be executed offline by the one or more service computing devices 108, such as by execution of the mapping program 116, and another portion of the process 300 may be executed online (e.g., during vehicle operation) by the one or more vehicle computing devices 104 or other types of computing devices, such as by execution of the fault management program 134. A vertical dashed line separates the respective offline and online operations. Furthermore, while in this example, certain functions are illustrated as being performed by one of the service computing devices 108 or the vehicle computing devices 104, in other examples, at least some of the functions may be performed by the other one of the service computing devices 108 or the vehicle computing devices 104.

At 302, the service computing device may conduct sensitivity analysis on selected software. For example, as discussed above, the service computing device may be provided with a selected piece of software that is determined to be useful for operation of the vehicle to warrant generation of an SPM map 136 and an FAM map 138 for enabling the selected software to continue to operate despite the occurrence of a permanent memory fault in an area of memory used by the selected software.

At 304, the service computing device may determine sensitive parameters of the selected software. For instance, as discussed additionally below, the service computing device may introduce simulated faults into bits of the parameters of the selected software to determine which parameters of the selected software are sensitive to being affected by memory faults. As one example, introducing a simulated fault may include flipping a bit at a memory location associated with the respective parameter.

At 306, the service computing device may allocate memory to the selected software to associate the sensitive parameters with locations in the memory.

At 308, the service computing device may create an SPM map 136 for the sensitive parameters of the selected software based on the memory locations determined at 306. Additional details of the creation of the SPM map 136 are discussed below, e.g., with respect to FIGS. 4 and 5.

At 310, the service computing device may provide the generated SPM map 136 for storage with the computing device that will execute the mapped software 135. For instance, the SPM map 136 may be provided with the mapped software 135 that is installed on the corresponding ECU when the vehicle 102 is undergoing production. In other examples, the service computing device may send the SPM map 136 to the vehicle 102 over the air after production is complete.

At 312 the service computing device may provide the mapped software 135 to the computing device that will execute the mapped software.

At 314, the service computing device may determine the FAM map 138 for the mapped software and may further determine execution time for all tasks associated with the mapped software 135. As one example, the service computing device may install and execute all software that will be executed by the targeted computing device that will execute the mapped software 135, and may determine the pointers and number of bytes for each free area of memory as well as the ease of accessibility of the free areas. Additionally, as mentioned above, in some examples the free memory areas may be located in the same chip or in a different memory chip such as on the same board as the ECU and the currently used memory.

At 316, the computing device may provide the FAM map 138 and the desired task times for the mapped software 135 to the computing device that will execute the mapped software 135.

After the SPM map 136 and the FAM map 138 have been generated for the mapped software 135, the mapped software 135 may be executed by a computing device during an online stage, such as by being executed by a vehicle computing device 104, as discussed above with respect to FIG. 1, or by another suitable computing device. Furthermore, the fault management program 134 may also be executed to monitor for possible memory faults such as by monitoring execution of the mapped software 135. The fault management program 134 may be executed by the same computing device as that executing the mapped software 135, or may be executed by a different computing device, such as a different vehicle computing device 104 in the case that the mapped software 135 is executed on a vehicle computing device 104.

At 318, the computing device may execute the fault management program 134 for monitoring whether a memory fault occurs in memory used by the mapped software 135.

At 320 the computing device executing the fault management program 134 may detect a possible permanent fault associated with memory used by the mapped software 135. If so, the process goes to 322. If not, the process returns so that the fault management program 134 continues monitoring for the occurrence of a memory fault.

At 322, when a possible memory fault has been detected the computing device accesses the SPM map 136, such as by retrieving the SPM map 136 from a local storage.

At 324, the computing device may scan the memory used by the mapped software 135 based on the SPM map 136. For example, the SPM map 136 may indicate which portions of the memory are used for storing sensitive parameters of the mapped software 135 that are sensitive to memory faults.

At 326, the computing device determines whether a memory fault has been detected in the scanned memory areas. If so, the process proceeds to 330. If not, the process proceeds to 328.

At 328, when no fault is detected in the scan memory areas, the fault management program 134 executing on the computing device may be set to ignore the detected fault.

At 330, when a permanent memory fault is detected in an area memory used to store sensitive parameters of the mapped software 135, the computing device may access the FAM map 138, such as in a local storage, and may determine one or more free memory buffer areas of available memory based on the FAM map 138.

At 332, the computing device may remap the relevant sensitive parameters of the mapped software 135 currently mapped to the faulty memory area to a free area of memory based on the FAM map 138. In particular, the relevant sensitive parameters are remapped to the highest priority buffer in the FAM map 138.

At 334, the computing device may check the execution time of the mapped software following the remapping of the sensitive parameters.

At 336, the computing device determines whether the execution time for the mapped software satisfies a predetermined threshold execution time for one or more tasks. If so, the process goes to 338. If not, the process goes back to 330 to map the sensitive parameters to a different free memory area. Furthermore, if the task execution time keeps on increasing, the remapping of parameters may be discarded, and the mapped software may be either terminated or reallocated to a different processor entirely, depending on the design strategy, system configuration, and the like. Additionally, considerations to be made for the termination of mapped software 135 may include whether control of the vehicle can be handed over to a vehicle operator and/or whether reducing the functionality of the ADS such as based on a graceful degradation strategy has been defined for the vehicle.

At 338, if the execution time threshold is satisfied, the computing device confirms the remapped parameters and updates the SPM map 136 and the FAM map 138 based on the remapping performed in response to the detected fault.

Figure 4:
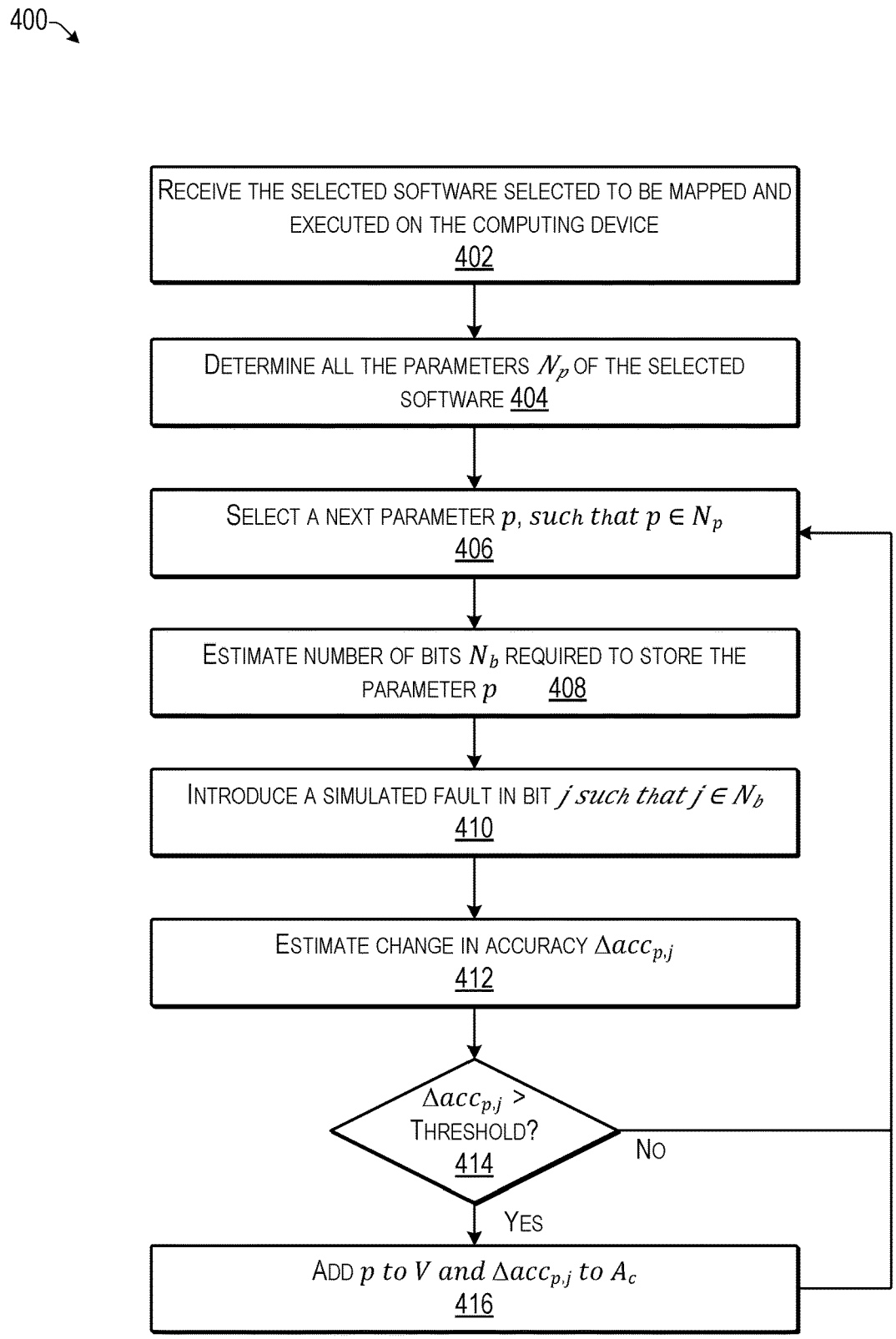
FIG. 4 is a flow diagram illustrating an example process for determining sensitive parameters of selected software that has been selected to be mapped software according to some implementations.

FIG. 4 is a flow diagram illustrating an example process 400 for determining sensitive parameters of selected software that has been selected to be mapped software according to some implementations. In some examples, the process 400 may be executed by the system 100 discussed above. For example, the process 400 may be executed by the service computing device(s) 108, such as by execution of the mapping program 116.

The example of FIG. 4 is described in the context of a deep neural network as the selected software, but implementations are not limited to the AI applications of this example, and may also be applied to conventional applications, computer programs, executable code and the like. In this example, the service computing device 108 may execute the mapping program 116 to perform the sensitivity analysis for the selected software by first assigning p to be the parameters in a trained machine learning model that, following the mapping will be implemented as the mapped software 135 on the computer device. For example p belongs to $N_p$ where $N_p$ is the number of parameters in the trained machine learning model. For all parameters, p in $N_p$, the service computing device 108 may introduce a simulated fault by flipping respective bits of p, and may estimate the change in accuracy $\Delta acc_{p,j}$, where j belongs to No such that ($0<j<N_b$) and $N_b$ is the number of bits required to store parameter p. If the accuracy change exceeds a set accuracy threshold, then the service computing device stores p parameters in an array V and the corresponding change in accuracy stored in an array $A_c$. These arrays V and $A_c$ may be subsequently used in determining the SPM map 136, as discussed below with respect to FIG. 5.

At 402, the service computing device may receive the selected software that has been selected to be mapped and executed on the computing device, such as a vehicle ECU or any of the various other computing devices discussed herein.

At 404, the service computing device may determine all the parameters $N_p$ of the selected software, where $N_p$ is the number of parameters p of the selected software.

At 406, the service computing device may select a next parameter p for processing where $p \in N_p$.

At 408, the service computing device may estimate the number of bits $N_b$ required to store the parameter p.

At 410, the service computing device may introduce a simulated fault at the bit j such that $j \in N_b$. As one example, the computing device may flip the bit j, e.g., from zero to one or from one to zero depending on the current bit value.

At 412, the service computing device may determine an estimated change in accuracy $\Delta acc_{p,j}$ of the trained machine learning model following the injection of the fault into bit j.

At 414, the service computing device may determine whether the change in accuracy $\Delta acc_{p,j}$ exceeds a threshold for permissible change in accuracy. If so, the process goes to 716. If not, the process goes to 706 to select a next parameter p for processing.

At 416, the service computing device may add the parameter p to the array V, and may add the change in accuracy $\Delta acc_{p,j}$ to the array $A_c$. The process may then return to 706 to select a next parameter p for processing.

Figure 5:
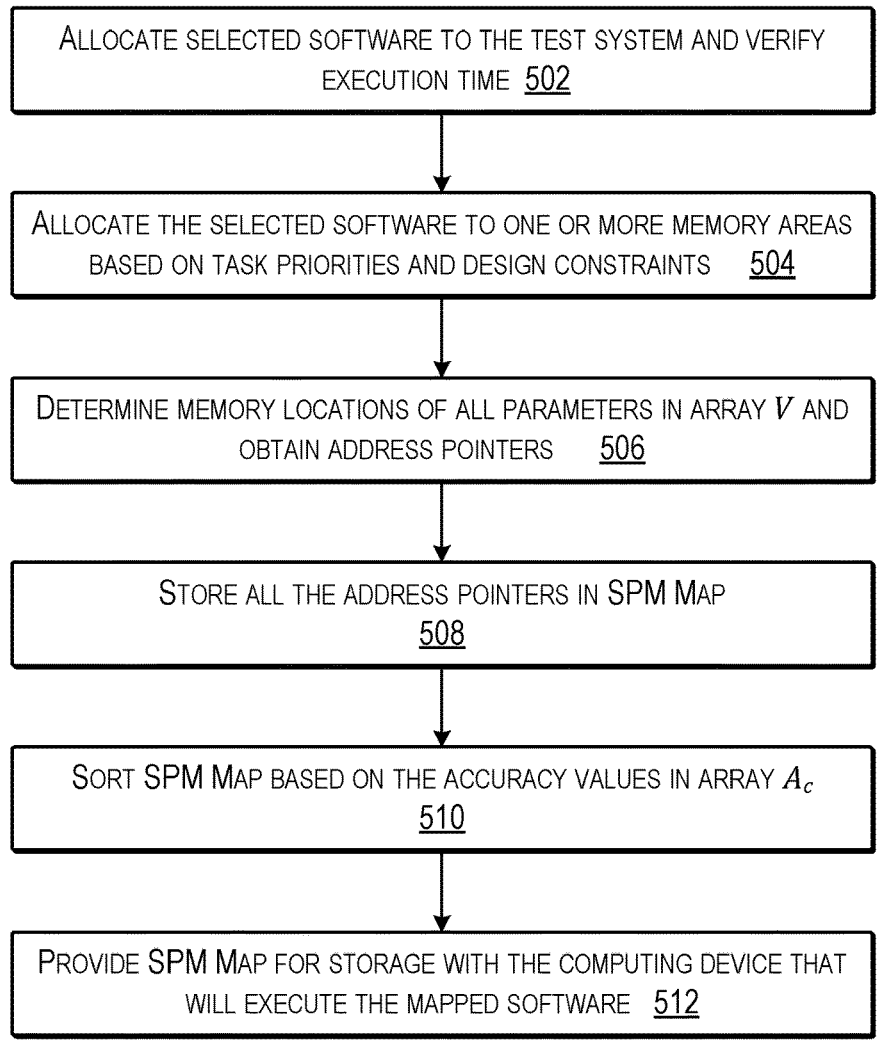
FIG. 5 is a flow diagram illustrating an example process for generating a sensitive parameters memory map (SPM map) according to some implementations.

FIG. 5 is a flow diagram illustrating an example process 500 for generating a sensitive parameters memory map (SPM map) according to some implementations. In some examples, the process 500 may be executed by the system 100 discussed above. For example, the process 500 may be executed by the service computing device(s) 108 executing the mapping program 116.

As one example, to create a SPM map 136, the service computing device may allocate the software to a test system, such as the test ECU, e.g., the ECU or ECU emulator device 160 of FIG. 1, and may verify the task execution time for the selected software that will be mapped. The selected software is fixed to one or more memory areas based on task priorities and design constraints. The service computing device may then find the memory areas corresponding to all the elements in array V determined above with respect to FIG. 4, and may get address pointers to the memory locations for all parameters in the array V. The service computing device stores these pointers in the SPM map 136. Consideration is given to the parameters that affect the accuracy the most. Accordingly, the SPM map is sorted according to the accuracy values stored in the array $A_c$ such that the parameters are ranked from those that affect accuracy the most to those that affect accuracy the least. The SPM map may be subsequently stored to be accessible by the same computing device that will execute the mapped software 135, and may be accessed in the case that a permanent fault is detected in the memory used by the mapped software 135.

At 502, the service computing device allocates the selected software to the test system and may verify task execution times for the selected software.

At 504, the service computing device allocates the selected software to one or more memory areas based on task priorities and design constraints.

At 506, the service computing device may determine the memory locations of all parameters in array V and may obtain address pointers for those parameters.

At 508, the service computing device may store all the address pointers in the SPM map 136.

At 510, the service computing device may sort the SPM map based on the accuracy values in the array $A_c$.

At 512, the service computing device may provide the SPM map for storage with the computing device that will execute the mapped software.

Figure 6:
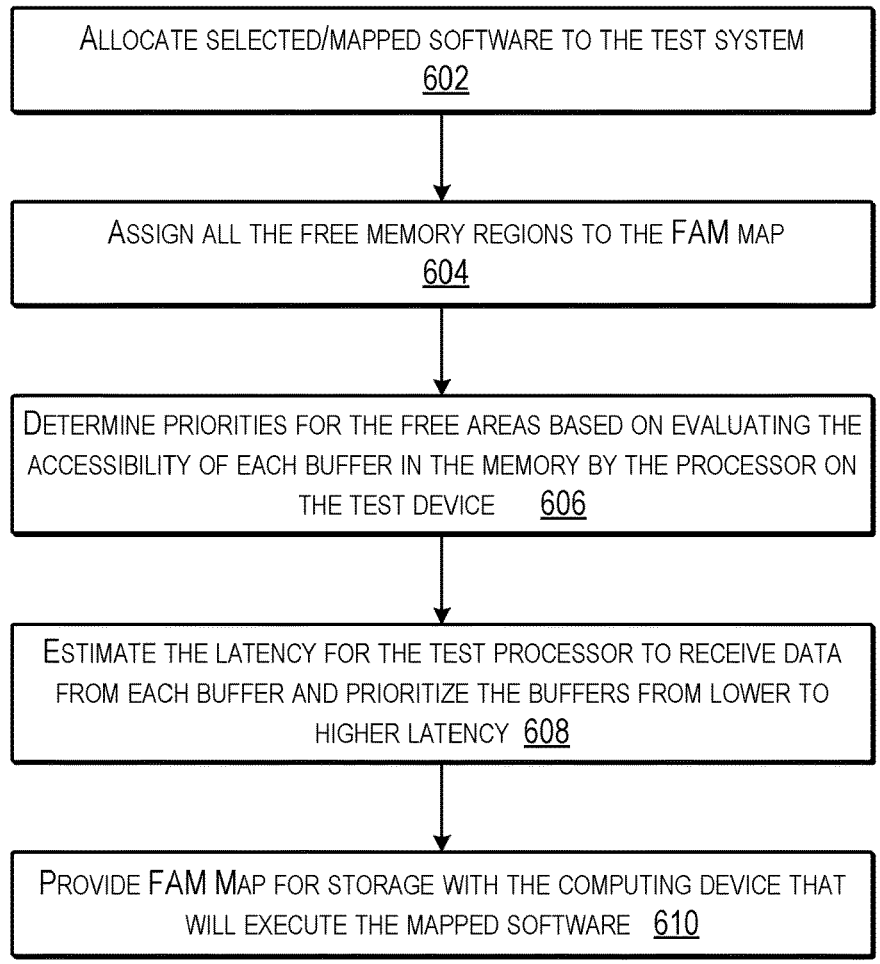
FIG. 6 is a flow diagram illustrating an example process for generating a free area memory map (FAM map) according to some implementations.

FIG. 6 is a flow diagram illustrating an example process 600 for generating a free area memory map (FAM map) according to some implementations. In some examples, the process 600 may be executed by the system 100 discussed above. For example, the process 600 may be executed by the service computing device(s) 108 executing the mapping program 116.

As one example, the service computing device(s) 108 may determine the FAM map 138 during the design and development stage. To create the FAM map 138, the service computing device 108 may allocates the mapped software 135 on the test system, such as a test ECU, e.g., the ECU or ECU emulator device 160 of FIG. 1, and may assign all the free memory regions to the FAM map. Then priorities for the free areas are created by evaluating the accessibility of each buffer in the memory by the processor on the test device. For estimating the priorities, a sample parameter may be stored in the buffers, and a scalar multiplication task may be allocated to the processor. The service computing device 108 may estimate the latency for the processor to receive data from each buffer, and the buffers are prioritized from lower to higher latency. Alternatively, the priorities of the free buffers may be estimated based on their address values if the test device has a memory controller, which can be programmed based on design requirements. The free memory map may then be stored with the computing device that will execute the mapped software 135.

At 602, the service computing device allocates the selected/mapped software to the test device or system.

At 604, the service computing device may assign all the free memory regions to the FAM map.

At 606, the service computing device may determine priorities for the free areas based on evaluating the accessibility of each buffer in the memory by the processor on the test device. For estimating the priorities, a sample parameter may be stored in the buffers, and a scalar multiplication task may be allocated to the processor.

At 608, the service computing device may estimate the latency for the test processor to receive data from each buffer and prioritize the buffers from lower to higher latency.

At 610, the service computing device may provide the FAM map for storage with the computing device that will execute the mapped software.

In addition, the task execution time and the threshold for maximum delay can be selected based on the tasks that the software needs to perform. The threshold and task execution time may also be stored to the computing device that executes the mapped software 135.

The application is then executed, and the task time is observed by monitoring software. If the task execution time is less than the set thresholds, then the remap memory location is confirmed. The SPM map is updated with the new memory locations. However, if the task execution time exceeds the set threshold, the buffer is discarded, and a new memory location is selected.

Furthermore, suppose the task execution time keeps on increasing. In that case, the remapping of parameters is discarded, and the application may be either terminated or reallocated to a different processor entirely, depending on the design strategy.

However, special considerations must be made for the termination of applications, such as handing control back to the driver or reducing the functionality of ADS based on the graceful degradation strategy defined in the design stage.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more computing devices configured by executable instructions to perform operations comprising:
monitoring for a memory fault associated with execution of software;
based at least on receiving an indication of a possible memory fault, scanning a first area of the memory based on a data structure that indicates that the first area of the memory stores a portion of parameters of the software that affect an accuracy of the software if there is a memory fault in the first area of the memory;
based at least on the scanning indicating that there is a memory fault in the first area of the memory, remapping the portion of parameters of the software from the first area to a second area of the memory that is determined to be free;
determining an execution time associated with the software following the mapping of the portion of the parameters to the second memory area; and
based at least on the execution time associated with the software exceeding a threshold time, remapping the portion of the parameters to a third memory area that is different from the first memory area and the second memory area.

2. The system as recited in claim 1, wherein the data structure indicating that the first area of the memory that stores the portion of the parameters of the software that will affect the accuracy of the software if there is a memory fault in the first area of the memory comprises a memory map that indicates storage locations of parameters of the software, including the portion of the parameters of the software.

3. The system as recited in claim 2, wherein the memory map is determined in advance based at least in part on:
introducing simulated faults into a test memory at a plurality of memory locations associated with a plurality of the parameters of the software; and determining an indication of an accuracy of the software following the introducing of each simulated fault.

4. The system as recited in claim 3, wherein the memory map is further determined based at least on ranking memory locations associated with respective parameters of the plurality of parameters based at least on an amount by which the accuracy of the software is affected by a respective introduced simulated fault.

5. The system as recited in claim 1, wherein the second area of the memory is determined from another data structure that indicates a plurality of free memory areas, wherein the free memory areas are prioritized, at least in part, based on a latency associated with each free memory area.

6. The system as recited in claim 1, wherein the one or more computing devices include a vehicle electronic control unit that executes the software for determining real-time predictions for controlling at least one vehicle system based at least on sensor information received from a plurality of vehicle sensors.

7. A method comprising:
monitoring, by one or more processors, for a memory fault associated with execution of software by the one or more processors;
based at least on receiving an indication of a possible memory fault, scanning a first area of the memory based on a data structure that indicates that the first area of the memory stores a portion of parameters of the software that affect an accuracy of the software if there is a memory fault in the first area of the memory;
based at least on the scanning indicating that there is a memory fault in the first area of the memory, remapping the portion of parameters of the software from the first area to a second area of the memory that is determined to be free;
determining an execution time associated with the software following the mapping of the portion of the parameters to the second memory area; and
based at least on the execution time associated with the software exceeding a threshold time, remapping the portion of the parameters to a third memory area that is different from the first memory area and the second memory area.

8. The method as recited in claim 7, wherein the data structure indicating that the first area of the memory that stores the portion of the parameters of the software that will affect the accuracy of the software if there is a memory fault in the first area of the memory comprises a memory map that indicates storage locations of parameters of the software, including the portion of the parameters of the software.

9. The method as recited in claim 8, wherein the memory map is determined in advance based at least in part on:
introducing simulated faults into a test memory at a plurality of memory locations associated with a plurality of the parameters of the software; and
determining an indication of an accuracy of the software following the introducing of each simulated fault.

10. The method as recited in claim 9, wherein the memory map is further determined based at least on ranking memory locations associated with respective parameters of the plurality of parameters based at least on an amount by which the accuracy of the software is affected by a respective introduced simulated fault.

11. The method as recited in claim 7, wherein the second area of the memory is determined from another data structure that indicates a plurality of free memory areas, wherein the free memory areas are prioritized, at least in part, based on a latency associated with each free memory area.

12. The method as recited in claim 7, wherein the one or more processors include a vehicle electronic control unit that executes the software for determining real-time predictions for controlling at least one vehicle system based at least on sensor information received from a plurality of vehicle sensors.

13. A non-transitory computer readable medium including executable instructions, which, when executed by one or more processors, configure the one or more processors to perform operations comprising:
monitoring for a memory fault associated with execution of software;
based at least on receiving an indication of a possible memory fault, scanning a first area of the memory based on a data structure that indicates that the first area of the memory stores a portion of parameters of the software that affect an accuracy of the software if there is a memory fault in the first area of the memory;
based at least on the scanning indicating that there is a memory fault in the first area of the memory, remapping the portion of parameters of the software from the first area to a second area of the memory that is determined to be free;
determining an execution time associated with the software following the mapping of the portion of the parameters to the second memory area; and
based at least on the execution time associated with the software exceeding a threshold time, remapping the portion of the parameters to a third memory area that is different from the first memory area and the second memory area.

14. The non-transitory computer readable medium as recited in claim 13, wherein the data structure indicating that the first area of the memory that stores the portion of the parameters of the software that will affect the accuracy of the software if there is a memory fault in the first area of the memory comprises a memory map that indicates storage locations of parameters of the software, including the portion of the parameters of the software.

15. The non-transitory computer readable medium as recited in claim 14, wherein the memory map is determined in advance based at least in part on:
introducing simulated faults into a test memory at a plurality of memory locations associated with a plurality of the parameters of the software; and
determining an indication of an accuracy of the software following the introducing of each simulated fault.

16. The non-transitory computer readable medium as recited in claim 13, wherein the second area of the memory is determined from another data structure that indicates a plurality of free memory areas, wherein the free memory areas are prioritized, at least in part, based on a latency associated with each free memory area.

17. The non-transitory computer readable medium as recited in claim 13, wherein the one or more processors include a vehicle electronic control unit that executes the software for determining real-time predictions for controlling at least one vehicle system based at least on sensor information received from a plurality of vehicle sensors.

* * * * *